United States Patent [19]

Emori et al.

[11] Patent Number: 5,330,024
[45] Date of Patent: Jul. 19, 1994

[54] STEERING FORCE CONTROL APPARATUS FOR POWER STEERING SYSTEM

[75] Inventors: Yasuyoshi Emori; Ikuo Nomura, both of Saitama, Japan

[73] Assignee: Jidosha Kiki Co., Ltd., Tokyo, Japan

[21] Appl. No.: 1,979

[22] Filed: Jan. 8, 1993

[30] Foreign Application Priority Data

Jan. 24, 1992 [JP] Japan .................. 4-032995

[51] Int. Cl.$^5$ .............................................. B62D 5/06
[52] U.S. Cl. ..................................... 180/141; 180/132; 180/149
[58] Field of Search ............... 180/132, 141, 142, 143, 180/149, 154, 162; 60/494; 91/434

[56] References Cited

U.S. PATENT DOCUMENTS

| | | | |
|---|---|---|---|
| 4,787,469 | 11/1988 | Yoshida et al. | 180/142 |
| 4,790,401 | 12/1988 | Sonoda | 180/142 |
| 4,793,433 | 12/1988 | Emori et al. | 180/132 |
| 4,899,842 | 2/1990 | Emori et al. | 180/142 |
| 5,135,068 | 8/1992 | Emori et al. | 180/142 |

Primary Examiner—Margaret A. Focarino
Assistant Examiner—Anne Marie Boehler
Attorney, Agent, or Firm—Townsend and Townsend Khourie and Crew

[57] ABSTRACT

A hydraulic reaction-type steering force control apparatus is provided to improve the sealing performance of a seal ring for preventing liquid leakage from a hydraulic reaction chamber by improving throttling actions in oil passages of chambers before and after the seal ring to prevent the reversal in pressure between the chambers before and after the seal ring. This eliminates a discontinuity phenomenon occurring due to a temporary deficiency of reaction oil pressure during steering operation caused by leakage from the hydraulic reaction chamber. The hydraulic reaction chamber constitutes a hydraulic reaction mechanism supplied with a reaction oil pressure from a hydraulic reaction force control valve mechanism, which is controlled in accordance with vehicle running conditions. A reaction piston has seal members on its slide surfaces and selectively constrains a relative rotational displacement between input and output shafts of a power steering system. First and second low-pressure chambers are allowed to communicate with a tank through their respective throttles. Also, a low-pressure chamber in the hydraulic reaction force control valve mechanism is connected on the upstream side of the throttle at position midway along a connection passage between the first low-pressure chamber and the tank. With this arrangement, the pressure in the hydraulic reaction chamber can be set substantially equal to or higher than the internal pressure in the first low-pressure chamber at any instant limiting the directions of the pressures acting on the seal members of the reaction piston to a predetermined direction constantly.

7 Claims, 4 Drawing Sheets

STEERING FORCE CONTROL APPARATUS FOR POWER STEERING SYSTEM

BACKGROUND OF THE INVENTION

The present invention relates to a steering force control apparatus suitable for the purpose of obtaining a required steering force by controlling a hydraulic reaction mechanism in a power steering system in accordance with various vehicle running conditions such as a running speed and a steering angle.

A steering force control apparatus using a hydraulic reaction mechanism is known as a steering force control apparatus for performing steering force control in accordance with various vehicle running conditions such as a running speed and a steering angle in a power steering system for reducing a steering wheel operating force (steering force) of an automobile.

Such a steering force control apparatus using a hydraulic reaction mechanism controls the magnitude of a reaction oil pressure in accordance with various vehicle running conditions and uses this reaction oil pressure as a selective constraining force between input and output shafts of a power steering system, thereby selectively constraining the two shafts or allowing them to rotate relative to each other.

For example, steering control is performed such that when a vehicle is kept stopped or running at low speeds, the reaction oil pressure is minimized to reduce the constraining force to enable a light steering operation; when a vehicle is running at high speeds, the reaction oil pressure is increased to obtain a large constraining force, thereby giving heaviness to a steering wheel to ensure stability in straight driving.

An example of a hydraulic reaction mechanism of this type is disclosed in U.S. Pat. No. 4,787,469. In this prior application, a reaction oil pressure is shunted from a portion of a main oil pressure passage extending from a pump to a power cylinder through a flow path switching valve, and introduced to a hydraulic reaction chamber for moving a reaction plunger, under the control of a reaction oil pressure control valve, such as a spool valve.

In this conventional apparatus, the reaction oil pressure control valve is commonly constituted by an electrical actuator, such as a solenoid coil or a stepping motor, capable of generating a necessary actuating force using an output current from a controller in accordance with detection signals from, e.g., a vehicle speed sensor, a steering angle sensor, and a torque sensor. Such electronic control can properly, reliably operate the hydraulic reaction mechanism to perform steering control according to a vehicle speed or a steering condition.

The above conventional apparatuses for performing steering force control using the hydraulic reaction mechanism, however, have a problem in sealing properties in the hydraulic reaction chamber. In addition, there is another problem derived from throttles and the like present in a hydraulic circuit. Because of these problems, the reaction oil pressure characteristic in the hydraulic reaction chamber sometimes temporarily differs from the characteristic of a pressure supplied from the hydraulic reaction force control valve. This consequently brings about a sense of unnaturalness as a so-called "discontinuity phenomenon" in which a steering torque does not increase smoothly during steering operation, resulting in an inability to perform the required steering force control.

For example, in a steering force control apparatus using a hydraulic reaction force, which is disclosed in, for example, U.S. Pat. No. 4,899,842, a hydraulic reaction chamber is formed around an output shaft in a housing, and a ring-like reaction piston is provided to be slidable in the axial direction at one end of the hydraulic reaction chamber. One end of the hydraulic reaction chamber is closed by seal rings arranged on the inner and outer circumferential surfaces of this piston; this separates the hydraulic reaction chamber from a low-pressure chamber, which is formed adjacent to the hydraulic reaction chamber to constitute a hydraulic reaction mechanism, and in which balls and a reaction force receiving unit are arranged. At the other end of the hydraulic reaction chamber, a ring-like partitioning member is fitted on the output shaft. A seal ring interposed between the outer circumferential surface of this partitioning member and the housing separates the hydraulic reaction chamber from a low-pressure chamber formed at the outer end of the hydraulic reaction chamber, thereby sealing the hydraulic reaction chamber.

The hydraulic reaction chamber is connected to the output port of a hydraulic reaction force control valve. The low-pressure chambers formed adjacent to the hydraulic reaction chamber at its two end portions are connected to a tank through discharge passages formed in a power steering main body and having throttles or the like at arbitrary positions.

In the above steering force control apparatus, the hydraulic reaction force control valve obtains a necessary reaction oil pressure by shunting a pressure oil from a pump to the hydraulic reaction chamber and to a low-pressure chamber on the tank side by means of variable throttles. The low-pressure chamber in this hydraulic reaction force control valve is connected to the tank through a path (e.g., a path indicated by a broken line in FIG. 1 to be described later) independent of the discharge passages from the neighboring low-pressure chambers of the hydraulic reaction chamber, in the power steering main body.

In the above conventional apparatus, however, a pressure Pr in the hydraulic reaction chamber and pressures P1 and P2 in the low-pressure chambers adjacent to the hydraulic reaction chamber sometimes take a relation Pr<P1, P2 under the influences of the respective oil pressure passages or the throttles midway along the passages. From this state, the reaction oil pressure Pr rises with a steering operation to meet a relation Pr>P1, P2.

Such a pressure change causes a change in direction in which the oil pressure acts on the seal rings for sealing the hydraulic reaction chamber from the neighboring low-pressure chambers at the two ends of the hydraulic reaction chamber, during the steering operation, and this degrades the sealing properties obtained in the hydraulic reaction chamber by the sealing rings.

This problem of reaction oil pressure variation in the hydraulic reaction chamber due to the leakage described above is serious particularly in the relationship with the low-pressure chamber which is adjacent to the hydraulic reaction chamber via the reaction piston. Therefore, it is necessary to establish a required relationship in pressure difference between these two chambers in order to perform steering force control using the hydraulic reaction force properly.

The degradation in sealing performance is liable to occur when the pressure relationship between Pr, P1, and P2 is reversed. The consequent leakage of the reaction oil pressure Pr and the pressure rise on the back pressure side, i.e., on the side of the low-pressure chambers at the two ends of the hydraulic reaction chamber cause a reduction in pressure difference; this sometimes makes it impossible to obtain required hydraulic reaction force rise characteristics in the hydraulic reaction chamber. As can be seen from a characteristic curve indicating an input torque-output oil pressure relationship shown in FIG. 4, if the output oil pressure increases due to a slight rise in the input torque, projections indicated by alternate long and two dashed lines take place. This may lead to an inconvenience that a steering wheel is turned too easily. Hence, a demand has arisen for a certain countermeasure capable of solving this problem.

SUMMARY OF THE INVENTION

It is, therefore, a principal object of the present invention to provide a steering force control apparatus of a power steering system, in which a pressure relationship between a hydraulic reaction chamber and low-pressure chambers formed at two ends of the hydraulic reaction chamber can be improved with a simple arrangement, sealing properties obtained in the hydraulic reaction chamber by sealing members can be ensured, a leakage of reaction oil pressure from the hydraulic reaction chamber can be prevented, variations in reaction oil pressure, which is apt to be unstable in conventional systems, can be prevented, continuous control for a hydraulic reaction force in the hydraulic reaction chamber can be enabled, and a sense of unnaturalness, such as a "discontinuity phenomenon" in steering operation can be prevented.

In order to achieve the above object according to the present invention, there is provided a steering force control apparatus for a power steering system, comprising a hydraulic reaction mechanism having a reaction piston held in a cylinder chamber so as to be movable parallel to input and output shafts of the power steering apparatus in order to selectively constrain a relative positional displacement between the input and output shafts, and a hydraulic reaction chamber formed in the cylinder chamber so as to apply a reaction oil pressure to the reaction piston, and a hydraulic reaction force control valve mechanism for controlling a pair of variable throttles on the upstream and downstream sides in association with each other in accordance with vehicle running conditions, thereby supplying an intermediate pressure produced between the variable throttles on the upstream and downstream sides as the reaction oil pressure to the hydraulic reaction chamber, wherein the reaction piston has seal members in slidable contact with inner wall surfaces of the cylinder chamber, the hydraulic reaction chamber being separated from a neighboring first low-pressure chamber by the reaction piston, the first low-pressure chamber is connected to a tank through a first connection passage having a throttle, and a low-pressure passage extending from a low-pressure chamber, formed at the downstream variable throttle on the downstream side in the hydraulic reaction force control valve mechanism, to the tank is connected to a position midway along the connection passage between the first low-pressure chamber and the tank and on the upstream side of the throttle.

DESCRIPTION OF THE PREFERRED EMBODIMENT

Figure 1:
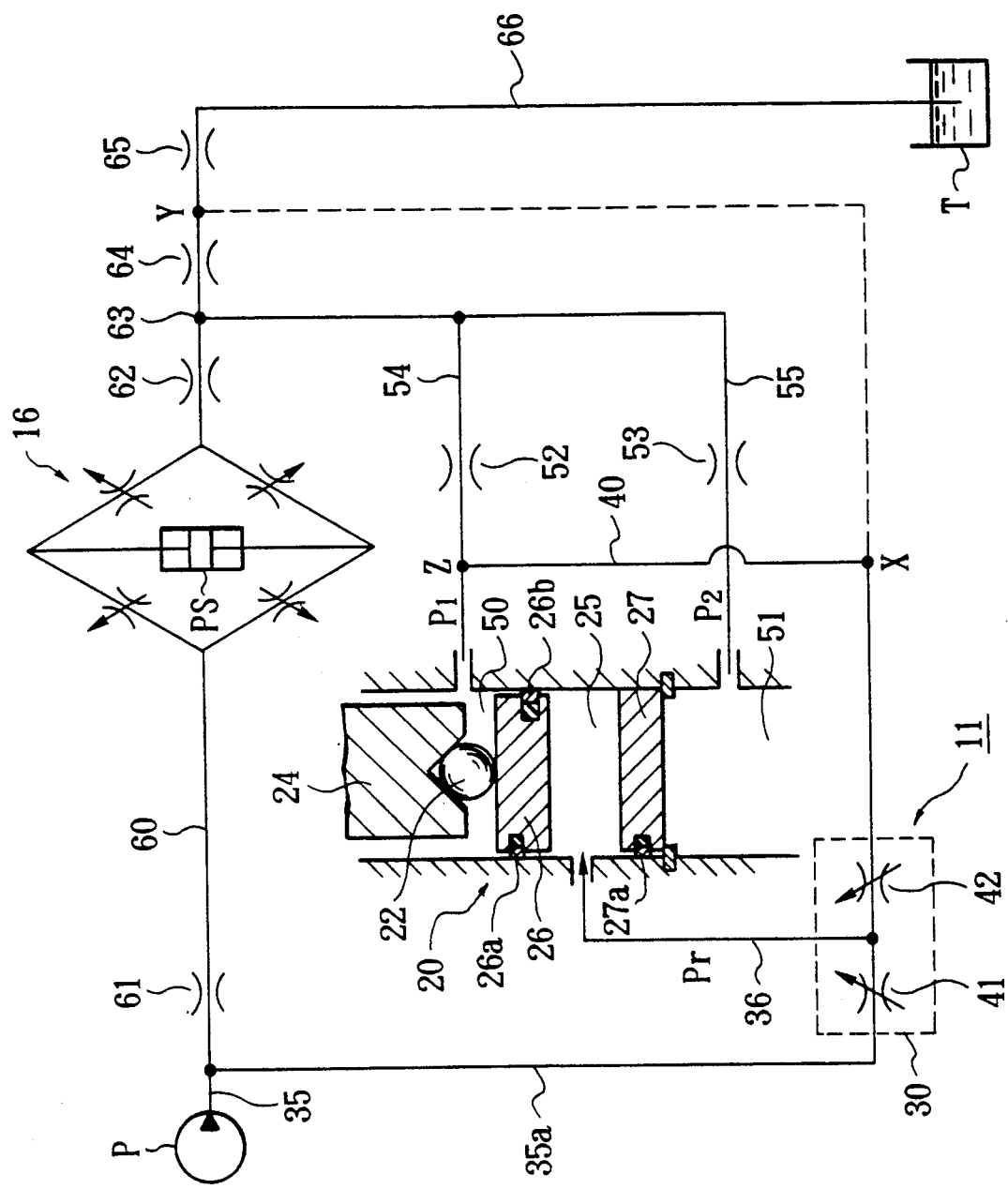
FIG. 1 is a schematic view showing the overall arrangement, including a hydraulic circuit, of an embodiment of a steering force control apparatus of a power steering system according to the present invention.

FIGS. 1 to 4 illustrate an embodiment of a steering force control apparatus for a power steering system according to the present invention. First, schematic arrangements of a power steering main body of the power steering system, generally denoted by reference numeral 10, and the steering force control apparatus, denoted by reference numeral 11, will be described below with reference to FIGS. 2 and 3.

Reference numeral 12 denotes an input shaft (stub shaft) coupled to a steering wheel (not shown); and 13, an output shaft (pinion shaft) coupled to the left end of the input shaft 12 via a torsion bar 14 and having a pinion to be meshed with a rack 15 constituting a steering link mechanism (not shown). These shafts 12 and 13 are rotated arbitrarily in their respective steering directions. As is well known, a fail-safe mechanism is arranged between the two shafts 12 and 13; the fail-safe mechanism is pivoted a predetermined angle or more to abut against these shafts, thereby coupling them to each other.

In a housing H constituting the power steering main body, a rotor 17 and a sleeve 18, which constitute a rotary flow path switching valve 16, are formed integrally with the shafts 12 and 13, respectively. A relative rotational displacement between the rotor 17 and the sleeve 18 makes it possible to perform switching between flow paths from an oil pump P and an oil tank T to left and right cylinder chambers (C1 and C2) of a power cylinder PS. Note that the arrangement and operation of the rotary flow path switching valve 16 of this type is conventionally known to those skilled in the art and a detailed description thereof will be omitted.

Reference numeral 20 denotes a hydraulic reaction mechanism arranged between the input and output shafts 12 and 13 formed integrally with the rotor 17 and the sleeve 18 constituting the flow path switching valve 16; the hydraulic reaction mechanism 20 constitutes a part of the steering force control apparatus 11.

More specifically, the hydraulic reaction mechanism 20 comprises a plurality of guide holes 21, a plurality of balls 22, a reaction force receiving unit 24, a hydraulic reaction chamber 25, and a ring-like reaction piston 26. The guide holes 21 are formed to axially extend through a flange portion formed on the output shaft 13. The balls 22 are held to be slidable only in the axial direction in these guide holes 21. The reaction force receiving unit 24 is formed on the input shaft 12 to oppose one side surface of the flange portion described above and has engaging recessed portions 23 in the same number as the balls 22; each engaging recessed portion 23 has inclined surfaces on its both sides in the direction of rotation, to which the ball 22 engages. The hydraulic reaction chamber 25 is formed on the side of the other side surface of the flange portion. The reaction piston 26 is held in the hydraulic reaction chamber 25 so as to be slidable coaxially with the input and output shafts 12 and 13; the reaction piston 26 pushes the balls 22 into the engaging recessed portions 23 of the reaction force receiving unit 24, thereby applying a constraining force corresponding to a reaction oil pressure to the input and output shafts 12 and 13.

Note that the reaction piston 26 has seal rings 26a and 26b, consisting of an O-ring and a resin ring, on its inner and outer circumferential portions, respectively, and is so installed as to be slidable in the axial direction in an annular space defined between the housing H and the output shaft 13.

Reference numeral 27 denotes a ring-like partitioning member fitted on the outer circumferential surface of the output shaft 13 with a slight oil-tight clearance between them in order to partition the other end of the hydraulic reaction chamber 25 such that the chamber is sealed. This partitioning member 27 is fitted on the output shaft 13 and has a seal ring 27a similar to those described above on its outer circumferential portion, thereby preventing a liquid leakage from the hydraulic reaction chamber 25.

In this arrangement, the reaction piston 26 is moved to the right in the axial direction by a reaction oil pressure supplied arbitrarily into the hydraulic reaction chamber 25 in accordance with various running conditions, such as a vehicle speed. The right end portion of the reaction piston 26 urges the balls 22 held in the guide holes 21 on the output shaft 13 side. The balls 22 are so urged in the axial direction as to engage with the engaging recessed portions 23 of the reaction force receiving unit 24 on the input shaft 12 side. As a result, a necessary constraining force derived from the hydraulic reaction force is obtained, and this constraining force arbitrarily constrains the condition of relative rotation between the input and output shafts 12 and 13. The consequent steering reaction force required makes feasible a proper steering force control.

That is, when the input shaft 12 is rotated upon steering operation, each ball 22 runs on one of the inclined surfaces of the engaging recessed portion 23 and moves in the axial direction by an amount of inclination. This urges the reaction piston 26, and the consequent reaction force is transmitted as a steering reaction force to the input shaft 12.

Note that the hydraulic reaction mechanism 20 of the above type is not limited to the structure of this embodiment, but any conventionally well-known hydraulic reaction mechanism can be used.

The hydraulic reaction force control valve mechanism 30 constituting the steering force control apparatus 11 will be described below.

The hydraulic reaction force control mechanism 30 comprises a sleeve 31 fitted in a hole portion 30a of the housing H; a spool 32 arranged slidably in the axial hole of the sleeve 31; and a solenoid 33 coupled to the spool 32 to move the spool 32 forward and backward. The solenoid 33 is supplied with a current under the control of a controller, which receives detection signals from, e.g., a vehicle sensor and a steering angle sensor (neither are shown), and controls the position of the spool 32 in the axial direction.

A distributor passage 34 constituted by an annular channel and a land portion on the left side of the channel is formed in the outer circumferential portion of the spool 32. The two sides of the land portion are tapered. Supply passages 35 and 35a communicating with the outlet of the pump P are open to the slide surface of the sleeve 31 with respect to the spool 32 and communicate with the left side of the distributor passage 34 through this opening.

A reaction force passage 36 communicating with the hydraulic reaction chamber 25 is open to the above slide surface on the left side of the supply passage 35a and communicates with the right side of the distributor passage 34 through this opening. With this arrangement, a first variable throttle 41 of the reaction oil pressure control valve mechanism 30 in FIG. 1 is constituted.

In addition, an annular channel 38 constituting a part of a discharge passage 37 is formed on the left side of the distributor passage 34, in the spool 32. The reaction force passage 36 communicates with the annular channel 38 through the left side of the land portion of the distributor passage 34. This constitutes a second variable throttle 42 of the reaction oil pressure control valve mechanism 30.

This discharge passage 37 communicates with a low-pressure chamber 39 at the left end portion of the spool 32 through an internal passage formed in the spool 32. The discharge passage 37 also communicates with the low-pressure side of the flow path switching valve 16 through a low-pressure passage 40 (to be described later) formed in the housing H, and is thereby connected to the tank T. Note that a low-pressure chamber is also formed at the right end portion of the spool 32, and this low-pressure chamber also communicates with the tank T through an internal passage or the like in the spool 32.

In this arrangement, when the solenoid 33 is in a nonconductive state, i.e., when the engine is kept stopped, the spool 32 is located at the left end position by a spring (not shown) in the solenoid 33. In this condition, the flow path area (at the first variable throttle 41) between the reaction force passage 36 and the supply passage 35a is maximized; the flow path area (at the second variable throttle 42) between the reaction force passage 36 and the discharge passage 37 is minimized.

When the vehicle with the engine being started is stopped or running at low speeds, the spool 32 is greatly moved to the right end position by the solenoid 33. At this time, the supply-side flow path area to the hydraulic reaction chamber 25 is minimized; the discharge-side flow path area is maximized. Therefore, the pressure in the hydraulic reaction chamber 25 essentially becomes zero to minimize the steering reaction force from the hydraulic reaction mechanism 20, and this realizes a light steering operation.

When the vehicle speed is increased, on the other hand, the spool 32 is gradually moved to the left by the solenoid 33, and the supply-side flow path area to the hydraulic reaction chamber 25 increases, whereas the discharge-side flow path area decreases, in accordance with the amount of movement. Hence, the steering reaction force to the steering wheel increases when the vehicle is running at high speeds, and this enables a stable steering operation with an appropriate heaviness.

Figure 2:
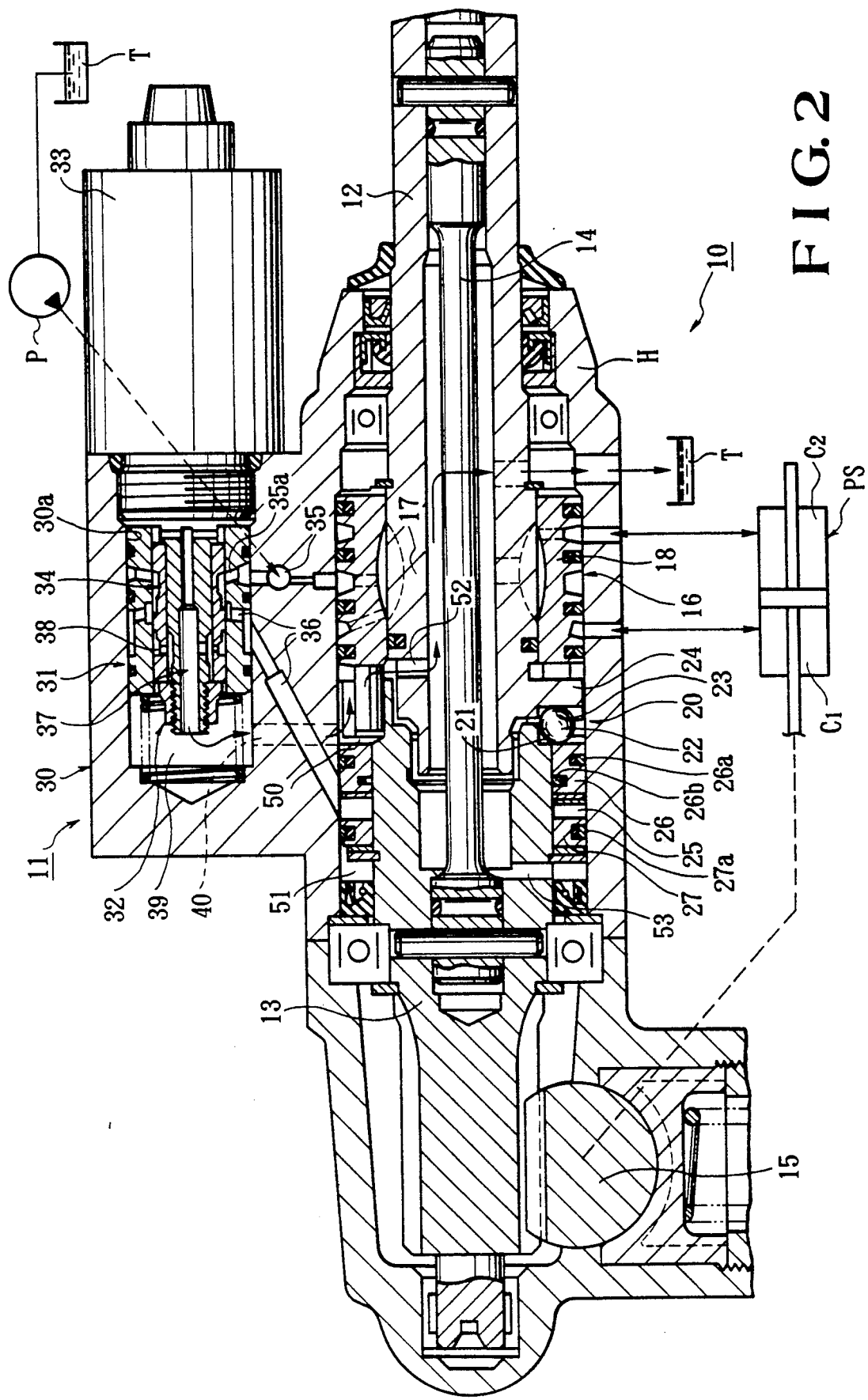
FIG. 2 is a schematic sectional view showing the overall arrangement of a power steering system having a steering force control apparatus to which the present invention is suitably applicable.
Figure 3:
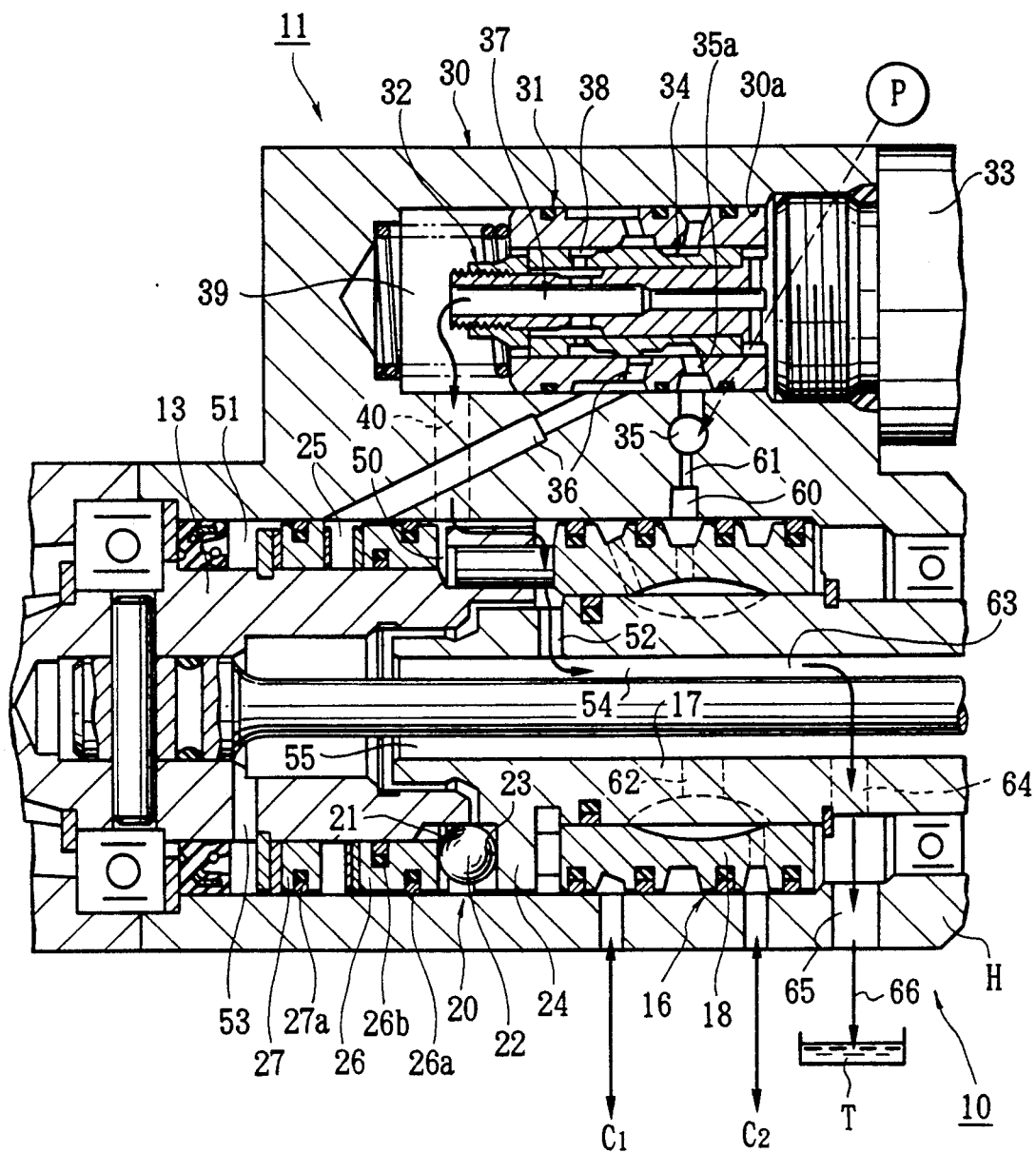
FIG. 3 is an enlarged schematic sectional view showing a main part of FIG. 2.

According to the present invention, as can be seen from FIG. 1 in addition to FIGS. 2 and 3, the steering force control apparatus 11 having the above arrangement, in which the hydraulic reaction chamber 25 constitutes the hydraulic reaction mechanism 20 supplied with a reaction oil pressure from the hydraulic reaction force control valve mechanism 30 which is controlled according to vehicle running conditions, and the reaction piston 26 has the seal rings 26a and 26b on its slide surfaces and selectively constrains the relative rotational displacement between the input and output shafts 12 and 13 of the power steering system, is characterized in that first and second low-pressure chambers 50 and 51, which are formed adjacent to the hydraulic reaction chamber 25 via the reaction piston 26 and the partitioning member 27, are allowed to communicate with the tank T through discharge passages 54 and 55 having throttles 52 and 53, respectively, and, in the hydraulic reaction force control valve mechanism 30, the low-pressure chamber 39 on the downstream side of the second variable throttle 42 is connected, through the low-pressure passage 40, to a position midway along the connection passage 54 between the first low-pressure chamber 50 and the tank T and on the upstream side of the throttle 52.

Referring to FIG. 1, the same reference numerals as in FIGS. 2 and 3 denote the same parts, and a detailed description thereof will be omitted.

Note that in FIG. 1, reference numeral 60 denotes a pressure oil supply passage branched from the supply passage 35 to supply a pressure oil from the pump P. A fixed throttle 61 formed in a portion of the supply passage 60 so that the pressure oil is introduced to the rotary flow path switching valve 16 consisting of the rotor 17 and the sleeve 18. Reference numeral 62 denotes a fixed throttle provided at the return side of the switching valve 16 to the tank T; 63, a low-pressure passage formed in the input shaft 12 to constitute a return passage for returning the pressure oil on the return side, which is supplied through the fixed throttle 62, to the tank T; and 64 and 65, fixed throttles formed midway along the discharge passage 66 from the low-pressure passage 63 to the tank T.

In the above arrangement, the present invention improves the throttling actions in the oil pressure passages through the hydraulic reaction chamber 25 and the low-pressure chambers 50 and 51 at the two ends of the hydraulic reaction chamber 25. More specifically, the low-pressure chamber 39 on the downstream side of the second variable throttle 42 in the hydraulic reaction force control valve mechanism 30 is connected on the upstream side of the throttle 52 at the position midway along the discharge passage 54 from the first low-pressure chamber 50 (adjacent to the hydraulic reaction chamber 25 via the reaction piston 26) to the tank T. Therefore, the hydraulic reaction mechanism 20 extending to the hydraulic reaction chamber 25 is set under the same conditions as the first and second low-pressure chambers 50 and 51, in the connection passage system to the tank T. This consequently eliminates the reversal of the pressure Pr in the hydraulic reaction chamber 25; the pressure Pr is equal to or higher than the pressures P1 and P2 ($Pr \geq P1, P2$) in the low-pressure chambers 50 and 51 at the two ends of the hydraulic pressure chamber 25 at any instant.

In conventional systems, the low-pressure passage 40 as the return passage from the hydraulic reaction force control valve mechanism 30 to the tank T is arranged like a path indicated by a broken line X - Y in FIG. 1. In the present invention, however, this passage is arranged like a path indicated by a solid line X - Z in FIG. 1. This consequently eliminates the pressure relationship of $Pr < P1, P2$ such as in conventional systems, and $Pr \geq P1, P2$ is constantly obtained.

As a result, the directions of oil pressures acting on the seal rings 26a and 26b of the reaction piston 26 and the seal ring 27a of the partitioning member 27, which constitute the hydraulic reaction chamber 25, are limited to one direction. This suppresses the motions of the seal rings 26a, 26b, and 27a to uniformize their sealing conditions, and a required hydraulic reaction force is applied to the hydraulic reaction chamber 25 to stabilize the operation of the reaction piston 26.

According to this embodiment, the aperture diameters of the throttles 52 and 53 in the discharge passages 54 and 55 from the first and second low-pressure chambers 50 and 51 are formed larger than those disclosed in Japanese Utility Model Laid-Open No. 1-70681 (U.S. Pat. No. 4,899,842), so that pressure drops in these throttles 52 and 53 are almost "0".

With the above arrangement, good sealing properties can be obtained between the hydraulic reaction chamber 25 and the neighboring low-pressure chambers 50 and 51 without increasing the frictions of the seal rings 26a, 26b, and 27a. That is, the sealing properties as described above may be assured by the squeezes of the O-rings constituting the seal rings 26a, 26b, and 27a. In this case, however, the friction of the ring increases to interfere with the motion of the reaction piston 26. This consequently requires a countermeasure so as to increase the hydraulic reaction force, resulting in practical problems.

In addition, according to the present invention, the sealing performance can be improved only by changing the position of the passage to the tank T without using any additional parts.

The pressure relationship in the hydraulic circuit of the above hydraulic reaction mechanism 20 will be briefly described below. In conventional structures, the hydraulic reaction pressure Pr in the hydraulic reaction chamber 25 is determined by the sum of a pressure $\Delta P30$ on the downstream side of the second variable throttle 42 in the hydraulic reaction force control valve mechanism 30 and a pressure $\Delta P65$ at the fixed throttle 65 in the discharge passage 66. On the other hand, the pressures P1 and P2 in the first and second low-pressure chambers 50 and 51 are the sums of pressures $\Delta P52$ and $\Delta P53$ at the throttles 52 and 53 in the connection passages 54 and 55 and pressures $\Delta P64$ and $\Delta P65$ at the fixed throttles 64 and 65 in the discharge passage 66, respectively.

In this case, $\Delta P30$ sometimes transits from a state in which it is smaller than ($\Delta P52 + \Delta P64$) and ($\Delta P53 + \Delta P64$) to a state in which it is larger than those. As a result, the state of $Pr < P1, P2$ occurs as described above.

According to the present invention, however, the reaction pressure Pr in the hydraulic reaction chamber 25 is obtained by adding the pressures $\Delta P64$ and $\Delta P65$ at the fixed throttles 64 and 65 in the discharge passage 66 to the pressure $\Delta P30$ on the downstream side of the second variable throttle 42 in the hydraulic reaction force control valve mechanism 30 and the pressure $\Delta P52$ at the throttle 52 in the connection passage 54 connected through the low-pressure passage 40. Therefore, compared to P1 and P2 described above, Pr is larger than P1 by the amount of $\Delta P30$, so even if Pr is 0, the above relation $Pr \geq P1$ is established.

P2, on the other hand, is 0 due to ΔP53. So it will be readily understood that the relation Pr≧P2 described above is also established in this case.

According to the steering force control apparatus 11 having the above arrangement, therefore, the pressure Pr in the hydraulic reaction chamber 25 of the hydraulic reaction mechanism 20, which is obtained by introducing the intermediate pressure between the first and second variable throttles 41 and 42 in the hydraulic reaction force control valve mechanism 30, can be set large (Pr≧P1, P2) relative to the pressures P1 and P2 in the low-pressure chambers formed adjacent to the hydraulic reaction chamber 25 via the reaction piston 26 and the partitioning member 27. This can prevent occurrence of a "sense of unnaturalness that a driver feels due to a so-called discontinuity phenomenon" taking place when the relation Pr<P1, P2 transits to the relation Pr>P1, P2 in conventional systems when the driver turns a steering wheel.

Figure 4:
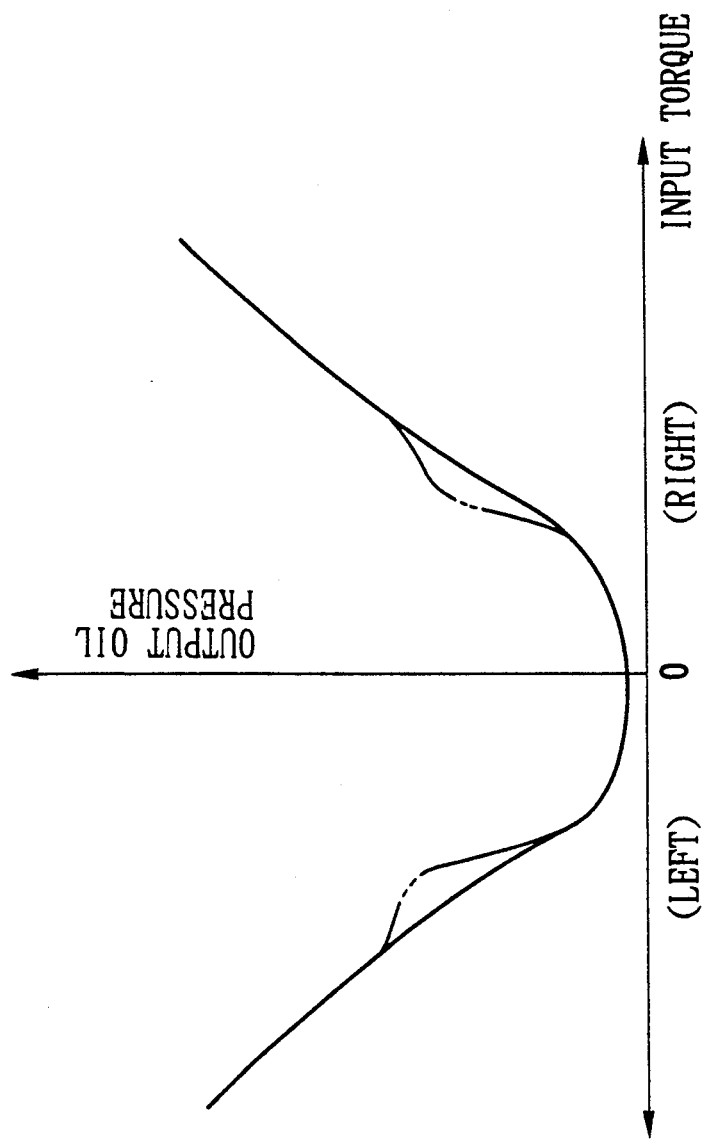
FIG. 4 is a graph showing the relationship between the input torque and the output oil pressure in a power steering system including the steering force control apparatus according to the present invention.

This advantage can eliminate the possibility of a phenomenon in which an output oil pressure abruptly increases with a slight rise in input torque, as indicated by alternate long and two dashed lines in FIG. 4; a phenomenon in which an auxiliary steering force obtained by the power cylinder PS increases excessively to make it impossible to obtain characteristics according to the rise in the reaction oil pressure Pr. As a result, as indicated by a solid line in FIG. 4, a proper hydraulic reaction force can be obtained, and this can change the steering force control in accordance with vehicle running conditions.

Note that the present invention is not limited to the structure of the above embodiment, but it is possible to arbitrarily modify and change the shapes, the structures, and the like of the individual parts of the power steering system (power steering main body 10) and the steering force control apparatus 11 constituted by the hydraulic reaction mechanism 20 and the hydraulic reaction force control valve mechanism 30.

For example, in the above embodiment, the steering force control apparatus 11 comprises the hydraulic reaction mechanism 20 and the hydraulic reaction force control mechanism 30. However, the present invention is not limited to this structure, so various modifications may be made including conventionally well-known structures. The present invention also allows the use of various types of power steering systems.

As has been described above, in the steering force control apparatus of a power steering system according to the present invention, the hydraulic reaction chamber is supplied with the reaction oil pressure from the hydraulic reaction force control valve mechanism, the reaction piston has the seal members on its slide surfaces and selectively constrains the relative rotational displacement between the input and output shafts of the power steering system, and the first and second low-pressure chambers, which are formed adjacent to the hydraulic reaction chamber via the reaction piston and the partitioning member, are allowed to communicate with the tank through the respective throttles. Also, the low-pressure chamber in the hydraulic reaction force control valve mechanism is connected on the upstream side of the throttle at a position midway along the connection passage between the first low-pressure chamber and the tank. This arrangement can present various startling effects enumerated below:

(1) Regardless of the simple arrangement in which only the connection position of the passage to the tank is altered, the hydraulic reaction force in the hydraulic reaction chamber can be set higher than the pressures in the two low-pressure chambers, which are formed adjacent to the hydraulic reaction chamber via the reaction piston and the partitioning member, at any instant without using any additional parts. At the same time, leakage from the hydraulic reaction chamber is minimized.

(2) Hence, it is possible to prevent occurrence of a "sense of unnaturalness that a driver feels due to a so-called discontinuity phenomenon" in which an output oil pressure is increased compared to an input torque by a temporary deficiency of a hydraulic reaction force caused by, e.g., leakage of a reaction oil pressure from the hydraulic reaction chamber when the driver turns a steering wheel.

What is claimed is:

1. A steering force control apparatus of a power steering system, comprising:
   a hydraulic reaction mechanism having a reaction piston held in a cylinder chamber so as to be movable coaxially to input and output shafts of said power steering apparatus in order to selectively constrain a relative positional displacement between said input and output shafts, and a hydraulic reaction chamber formed in said cylinder chamber so as to apply a reaction oil pressure to said reaction piston; and
   a hydraulic reaction force control valve mechanism for controlling a first variable throttle paired with a second variable throttle, said first variable throttle being upstream from said second variable throttle, said first variable throttle and said second variable throttle in association with each other in accordance with vehicle running conditions, thereby supplying an intermediate pressure produced between said first variable throttle and said second variable throttle as the reaction oil pressure to said hydraulic reaction chamber,
   wherein said reaction piston has seal members in slidable contact with inner wall surfaces of said cylinder chamber, said hydraulic reaction chamber being separated from a neighboring first low-pressure chamber by said reaction piston,
   said first low-pressure chamber is connected to a tank through a first connection passage having a third throttle, and
   a low-pressure passage extending from a low-pressure chamber, formed at said second variable throttle on the downstream side in said hydraulic reaction force control valve mechanism, to said tank is connected to a position midway along said connection passage between said first low-pressure chamber and said tank and on the upstream side of said third throttle.

2. An apparatus according to claim 1, wherein
   said hydraulic reaction mechanism uses, as said cylinder chamber, an annular space formed between an outer circumferential portion of one of said input and output shafts and an inner wall of a housing of said power steering system,
   said reaction piston is disposed in said annular space so as to be slidable coaxially to said input and output shafts, and
   said hydraulic reaction chamber and said first low-pressure chamber are formed at two ends of said reaction piston in the direction of movement.

3. An apparatus according to claim 1, wherein said hydraulic reaction force control valve mechanism is constituted by a variable spool valve so that said pair of variable throttles on the upstream and downstream sides are operated in association with each other, and the reaction oil pressure extracted from said variable spool valve and supplied to said hydraulic reaction chamber is set higher than a pressure in said first low-pressure chamber at any instant.

4. An apparatus according to claim 1, further comprising a pump for supplying a pressure oil to said power steering system through oil pressure supply passages, and wherein an oil pressure passage branched from said oil pressure supply passages from said pump is connected to a position at said upstream variable throttle on the upstream side in said hydraulic reaction force control valve mechanism.

5. An apparatus according to claim 1, wherein a partitioning member is arranged at the other end of said hydraulic reaction chamber opposite to said reaction piston in said cylinder chamber, said hydraulic reaction chamber is separated from a neighboring second low-pressure chamber by said partitioning member, and said second low-pressure chamber has a throttle and is connected, on the downstream side of said throttle, to said tank through a second connection passage connected to said first connection passage from said first low-pressure chamber.

6. An apparatus according to claim 5, wherein said hydraulic pressure chamber and said second low-pressure chamber constituting said hydraulic reaction mechanism are separated from each other by a partitioning member disposed to oppose said reaction piston in the annular space formed between said hydraulic reaction mechanism and the outer circumferential portion of one of said input and output shafts inside the inner wall of said housing of said power steering system.

7. An apparatus according to claim 5, wherein said partitioning member has a seal member between said partitioning member and the inner wall of said cylinder chamber.

* * * * *